US008775176B2

(12) United States Patent  
Gilbert et al.

(10) Patent No.: US 8,775,176 B2  
(45) Date of Patent: *Jul. 8, 2014

(54) METHOD AND SYSTEM FOR PROVIDING AN AUTOMATED WEB TRANSCRIPTION SERVICE

(71) Applicant: AT&T Intellectual Property II, L.P., Atlanta, GA (US)

(72) Inventors: Mazin Gilbert, Warren, NJ (US); Stephan Kanthak, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,901

(22) Filed: Aug. 26, 2013

(65) Prior Publication Data

US 2013/0346086 A1 Dec. 26, 2013

Related U.S. Application Data

(63) Continuation of application No. 11/469,016, filed on Aug. 31, 2006, now Pat. No. 8,521,510.

(51) Int. Cl.
*G10L 15/26* (2006.01)
*G10L 15/06* (2013.01)
*G10L 15/18* (2013.01)
*G10L 13/08* (2013.01)
*G10L 21/00* (2013.01)

(52) U.S. Cl.
USPC .......... 704/235; 704/9; 704/10; 704/243; 704/257; 704/260; 704/261; 704/270; 704/270.1; 704/275

(58) Field of Classification Search
USPC .............. 704/9, 10, 235, 243, 257, 260, 261, 704/270, 270.1, 275
See application file for complete search history.

(56) References Cited

U.S. PATENT DOCUMENTS

| | | | |
|---|---|---|---|
| 5,450,524 A * | 9/1995 | Rissanen | 704/245 |
| 5,761,689 A * | 6/1998 | Rayson et al. | 715/210 |
| 5,864,805 A * | 1/1999 | Chen et al. | 704/235 |
| 5,907,597 A * | 5/1999 | Mark | 379/93.03 |
| 6,104,995 A | 8/2000 | Shimada et al. | |
| 6,122,614 A | 9/2000 | Kahn et al. | |
| 6,173,259 B1 | 1/2001 | Bijl et al. | |
| 6,347,296 B1 * | 2/2002 | Friedland | 704/231 |
| 6,366,882 B1 | 4/2002 | Bijl et al. | |
| 6,418,410 B1 * | 7/2002 | Nassiff et al. | 704/251 |
| 6,789,231 B1 * | 9/2004 | Reynar et al. | 715/256 |
| 6,865,258 B1 | 3/2005 | Polcyn | |
| 6,999,933 B2 | 2/2006 | Hoi | |
| 7,069,513 B2 | 6/2006 | Damiba | |
| 7,184,956 B2 | 2/2007 | Frimpong-Ansah | |
| 7,292,975 B2 | 11/2007 | Lovance et al. | |
| 7,321,852 B2 | 1/2008 | Stanford | |
| 7,376,561 B2 | 5/2008 | Rennillo et al. | |
| 7,502,741 B2 | 3/2009 | Finke et al. | |
| 7,818,175 B2 | 10/2010 | Carus et al. | |

(Continued)

*Primary Examiner* — Edgar Guerra-Erazo

(57) ABSTRACT

A system, method and computer readable medium that provides an automated web transcription service is disclosed. The method may include receiving input speech from a user using a communications network, recognizing the received input speech, understanding the recognized speech, transcribing the understood speech to text, storing the transcribed text in a database, receiving a request via a web page to display the transcribed text, retrieving transcribed text from the database, and displaying the transcribed text to the requester using the web page.

20 Claims, 4 Drawing Sheets

(56) References Cited

U.S. PATENT DOCUMENTS

| | | |
|---|---|---|
| 8,032,372 B1 | 10/2011 | Zimmerman et al. |
| 8,117,034 B2 | 2/2012 | Gschwendtner |
| 8,229,742 B2 | 7/2012 | Zimmerman et al. |
| 2002/0046032 A1* | 4/2002 | Wutte .................. 704/270 |
| 2002/0143533 A1 | 10/2002 | Lucas et al. |
| 2003/0014261 A1 | 1/2003 | Kageyama |
| 2003/0182622 A1 | 9/2003 | Sibal et al. |
| 2003/0225578 A1 | 12/2003 | Kahn et al. |
| 2004/0006474 A1 | 1/2004 | Gong et al. |
| 2004/0088162 A1 | 5/2004 | He et al. |
| 2004/0141597 A1 | 7/2004 | Giacomelli |
| 2004/0199375 A1 | 10/2004 | Ehsani et al. |
| 2004/0267527 A1 | 12/2004 | Creamer et al. |
| 2005/0010411 A1* | 1/2005 | Rigazio et al. ................ 704/246 |
| 2006/0041427 A1 | 2/2006 | Yegnanarayanan et al. |
| 2006/0041428 A1 | 2/2006 | Fritsch et al. |
| 2006/0074656 A1 | 4/2006 | Mathias et al. |
| 2006/0190253 A1 | 8/2006 | Hakkani-Tur et al. |
| 2007/0106724 A1 | 5/2007 | Gorti et al. |
| 2007/0208567 A1 | 9/2007 | Amento et al. |
| 2007/0299664 A1 | 12/2007 | Peters et al. |
| 2009/0048833 A1 | 2/2009 | Fritsch et al. |

* cited by examiner

METHOD AND SYSTEM FOR PROVIDING AN AUTOMATED WEB TRANSCRIPTION SERVICE

PRIORITY INFORMATION

The present application is a continuation of U.S. patent application Ser. No. 11/469,016, filed Aug. 31, 2006, the content of which is incorporated herein by reference in its entirety.

BACKGROUND OF THE INVENTION

1. Field of the Invention

The present invention relates to a feature for use in web-based services and in particular, to a system, method and computer-readable medium that provides automated web transcription services.

2. Introduction

Transcribing human speech is a multi billion dollar business in the United States alone. One of the major drivers for speech transcription is the medical industry. The majority of the medical transcription industry is outsourced to India for manual transcription and is worth over $40 billion dollar per year. Many companies provide medical professionals the ability to manually transcribe recorded files but charge about $4-5 per report (10 cents per 64 characters). The word accuracy of these reports range from 94-98% per word.

Conventional ways of performing automatic transcription of medical reports as well as other types of reports, such as legal and government documents, have included several attempts for creating stand-alone personal computer (PC) products for business professionals, such as the Nuance Dragon system. However, these programs have not been very successful primarily because (1) the failure of the speech technology in providing high accuracy speech recognition, (2) the complexity of using and customizing the speech technology for specific industrial or personal needs, and (3) the lack of flexibility provided by the fact that access to the dictation software and access to the dictation itself is limited to a single PC.

SUMMARY OF THE INVENTION

A system, method and computer readable medium that provides automated web transcription service is disclosed. The method may include receiving input speech from a user using a communications network, recognizing the received input speech, understanding the recognized speech, transcribing the understood speech to text, storing the transcribed text in a database, receiving a request via a web page to display the transcribed text, retrieving transcribed text from the database, and displaying the transcribed text to the requester using the web page.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a system, method, computer-readable medium, and other embodiments that relate to the basic concepts of the invention.

Figure 1:
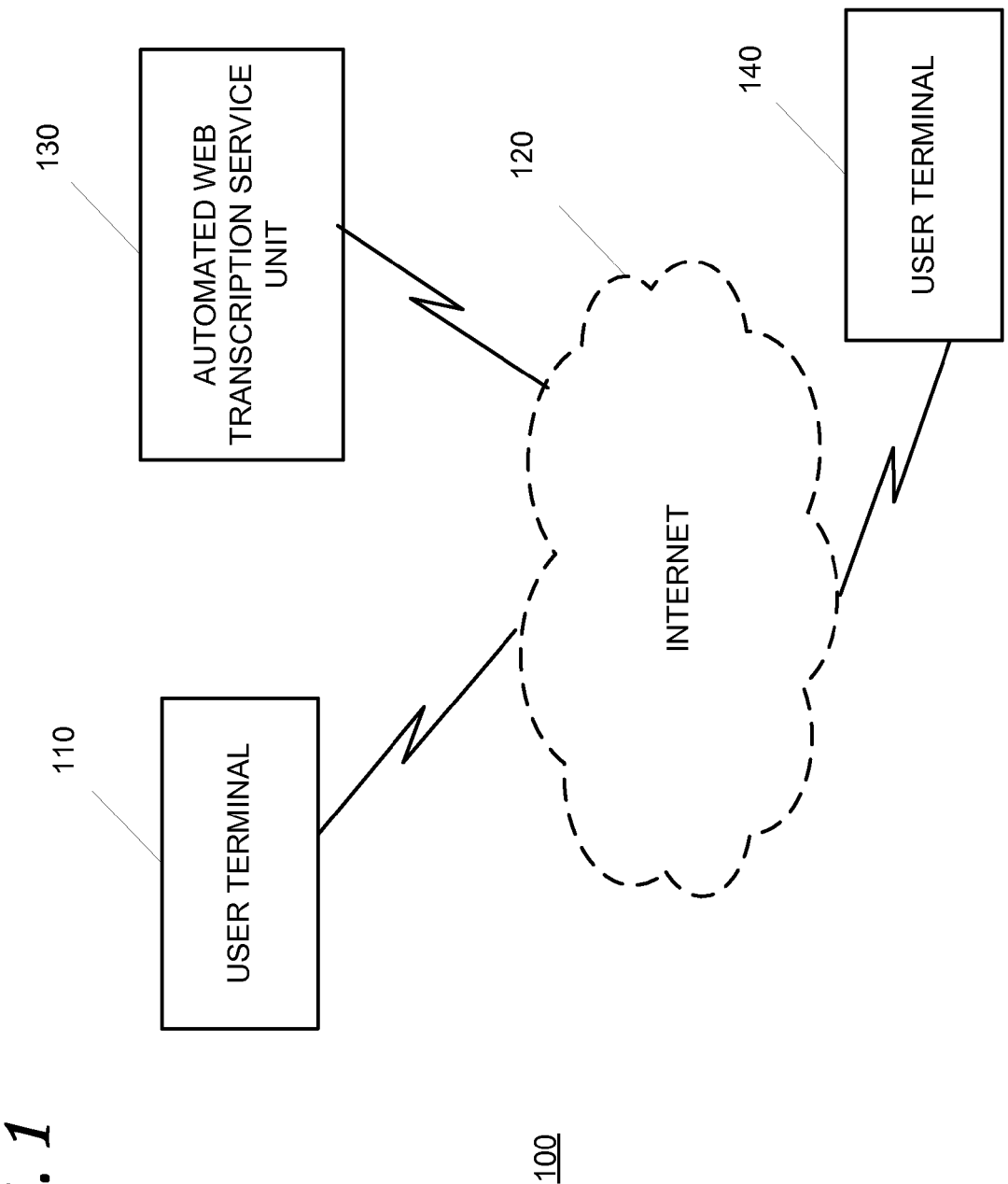
FIG. 1 illustrates an exemplary diagram of a network environment in accordance with a possible embodiment of the invention.

FIG. 1 illustrates an exemplary diagram of a network environment 100 in accordance with a possible embodiment of the invention. In particular, the network environment 100 includes user terminals 110, 140, internet 120 and automated web transcription service unit 130.

One of skill in the art will appreciate that the network environment 100 may be any possible configuration in which a processing device may be accessible to the internet 120. While the internet 120 is illustrated, one of skill in the art will appreciate that the web data language model generation process discussed herein may be implemented in conjunction with other network systems, such as an intranet or any other network system capable of hosting domains containing web page data, for example.

The network environment 100 and the automated web transcription service unit 130 illustrated in FIG. 1 and the related discussion are intended to provide a brief, general description of a suitable computing environment in which the invention may be implemented. Although not required, the invention will be described, at least in part, in the general context of computer-executable instructions, such as program modules, being executed by the automated web transcription service unit 130, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 2:
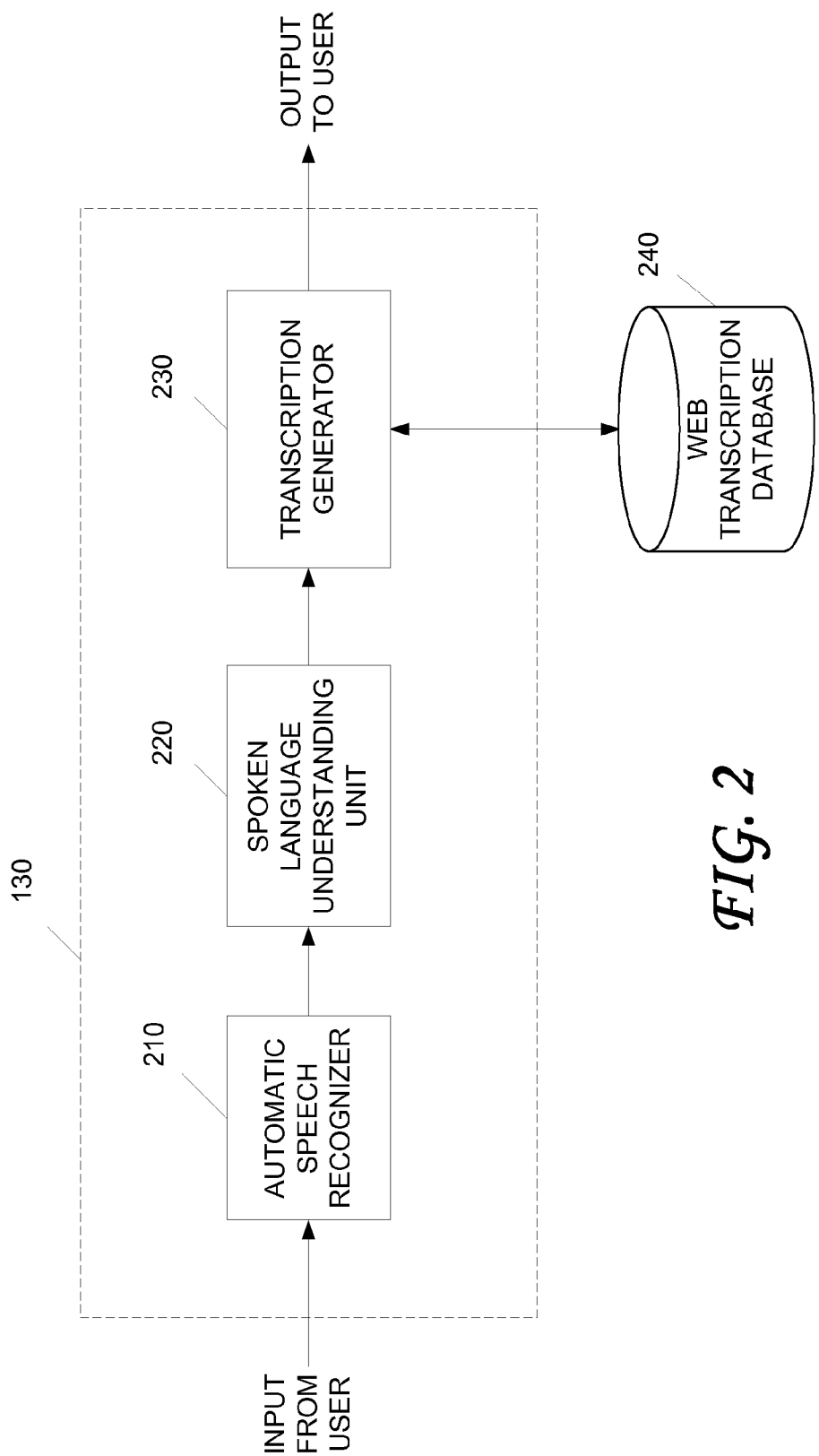
FIG. 2 illustrates an exemplary block diagram of an exemplary automated web transcription service unit in accordance with a possible embodiment of the invention.

FIG. 2 is an exemplary block diagram of a possible embodiment of the automated web transcription service unit 130 shown in FIG. 1. The automated web transcription service unit 130 may include automatic speech recognizer (ASR) 210, spoken language understanding (SLU) unit 220, and transcription generator 230.

The ASR 210 receives a user's input speech and may be of any known design and performs the function of recognizing, or spotting, the existence of one or more speech parts in the user's input speech. The ASR 210 may also be tasked with recognizing system commands, such as "CORRECTION", "STOP", "PAUSE", "BEGIN", "GO TO (parts of a customized template)", etc.

The SLU unit 220 may be of any known design that performs the function of receiving and understanding the recognized speech and system commands that may be spoken by the user.

The transcription generator 230 receives the understanding data from the SLU unit 220 and forms the transcribed document for presentation to the user. FIG. 2 also shows a web transcription database 240 which stores transcriptions generated by the transcription generator 230 while they wait to be accessed by a requester.

Figure 3:
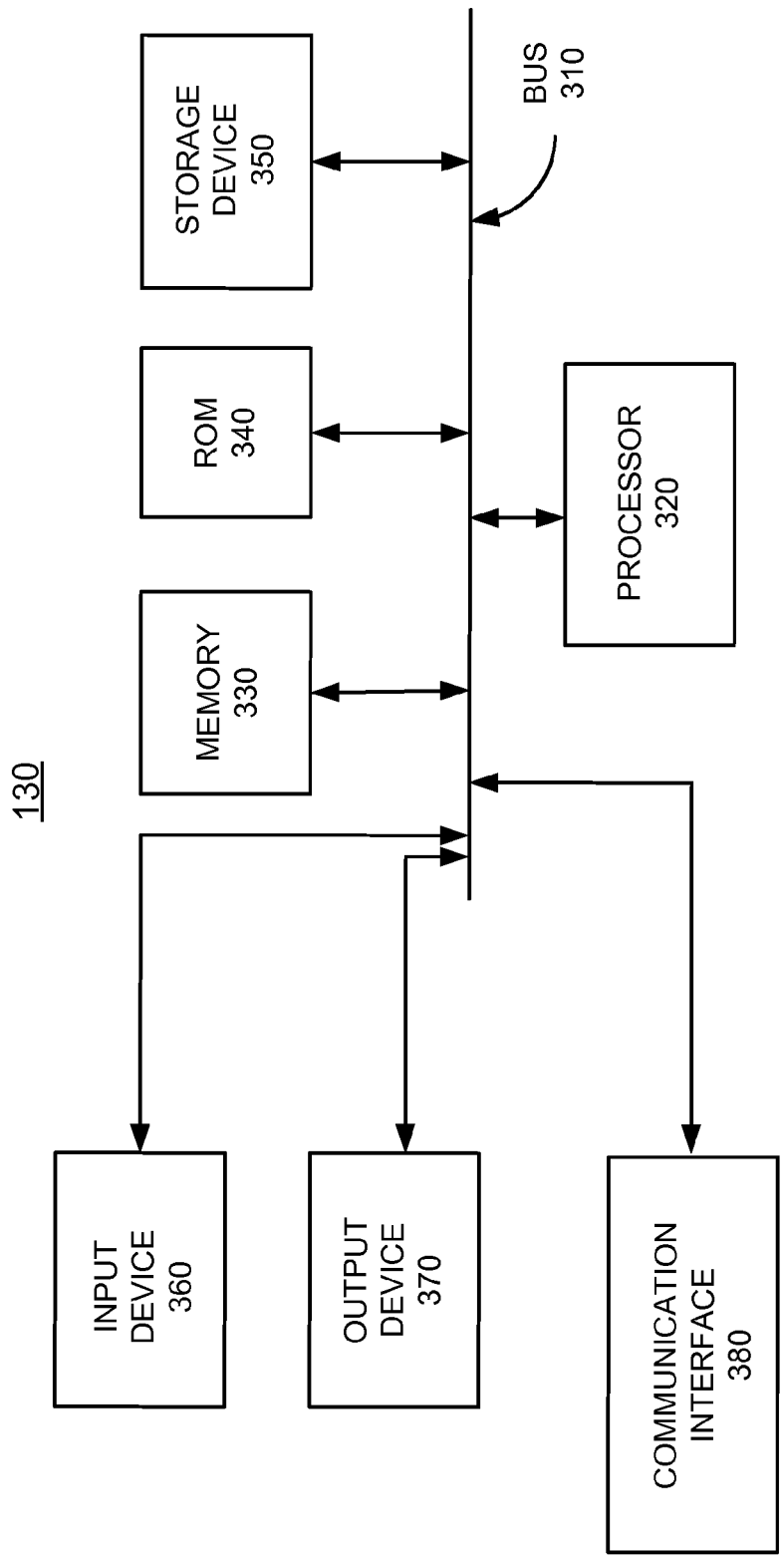
FIG. 3 illustrates an exemplary block diagram of a processing device for implementing the automated web transcription service method in accordance with a possible embodiment of the invention.

FIG. 3 illustrates an exemplary automated web transcription service unit 130 which may implement one or more modules or functions shown in FIGS. 1 and 2. Thus, exemplary automated web transcription service unit 130 may include may include a bus 310, a processor 320, a memory 330, a read only memory (ROM) 340, a storage device 350, an input device 360, an output device 370, and a communication interface 380. Bus 310 may permit communication among the components of the automated web transcription service unit 130.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of media, such as, for example, magnetic or optical recording media and its corresponding drive.

Input device 360 may include one or more conventional mechanisms that permit a user to input information to the automated web transcription service unit 130, such as a keyboard, a mouse, a pen, a voice recognition device, etc. Output device 370 may include one or more conventional mechanisms that output information to the user, including a display, a printer, one or more speakers, or a medium, such as a memory, or a magnetic or optical disk and a corresponding disk drive. Communication interface 380 may include any transceiver-like mechanism that enables the automated web transcription service unit 130 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of the network environment 100, communication interface 380 may not be included in exemplary automated web transcription service unit 130 when the automated web transcription process is implemented completely within a single automated web transcription service unit 130.

The automated web transcription service unit 130 may perform such functions in response to processor 320 by executing sequences of instructions contained in a computer-readable medium, such as, for example, memory 330, a magnetic disk, or an optical disk. Such instructions may be read into memory 330 from another computer-readable medium, such as storage device 350, or from a separate device via communication interface 380.

For illustrative purposes, the web data language model generation process will be described below in relation to the block diagrams shown in FIGS. 1, 2 and 3.

Figure 4:
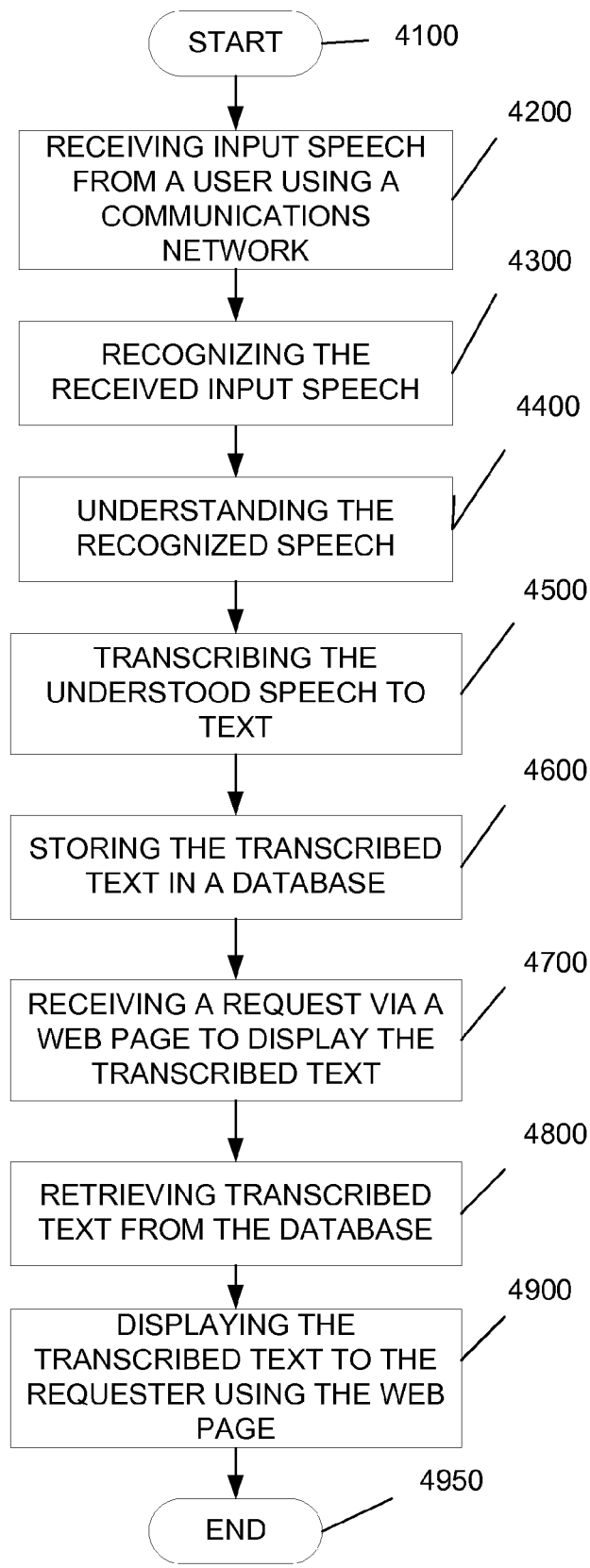
FIG. 4 illustrates an exemplary flowchart illustrating the automated web transcription service method in accordance with a possible embodiment of the invention.

FIG. 4 is an exemplary flowchart illustrating some of the basic steps associated with a automated web transcription service process in accordance with a possible embodiment of the invention. The process begins at step 4100 and continues to step 4200 where the ASR 210 receives input speech from a user. The speech may be received over a telephone line, web cast, uploading of an audio file, or other manner known to those of skill in the art to provide the ASR 210 with an audio input. At step 4300, the ASR 210 recognizes the received input speech. At step 4400, the SLU unit 220 understands the recognized speech as well as other system commands as discussed above.

At step 4500, the transcription generator 230 transcribes the understood speech to text and generates a document in a suitable format for presentation and display. At step 4600, the transcription generator 230 send the transcribed document to the transcription database 240 for storage.

In step 4700, the transcription generator 230 receives a request via a web page to display the transcribed text. At step 4800, the transcription generator 230 retrieves the transcribed text from the web transcription database 240, and at step 4900, displays the transcribed text to the requester using the web page. The transcription may be displayed on the same web page or web site that was used to upload the transcription or request the transcription or it may be display on a different one. In any event, the requester may go to the website and review the transcribed dictation. There may be an approval process whereby the requester can approve or not approve the transcription. The requester may also be permitted to correct the transcription. Once the transcription is approved, a charge may be made on a credit card, for example. Alternatively, a subscription rate may be such that a yearly payment is made for unlimited transcriptions, for example.

The transcription generator 230 may allow the requester to simply print out the transcription. Alternatively, the transcription generator 230 may provide the option to e-mail, send etc. the transcription to another user or institution, for example. In this manner, one person can upload or dictate, another can approve, and still a third person can receive the finished transcription. Or it can be the same person performing all three processes.

As stated above, the transcription generator 230 may allow the requester correct errors in the transcription. The corrected errors may be fed back into the automated web transcription service unit 130 in an active learning manner to improve the future accuracy of the transcriptions. The process goes to step 4950 and ends.

The automated web transcription service unit 130 process may also allow users to enroll through the web. For example, a group of professionals (e.g., law firm or hospital) or a person such as a doctor on his/her own would go to the website and would enroll in the service by providing certain personal and billing information, such as credit card information, etc. The automated web transcription service unit 130 may also allow the user to identify from a simple drop down menu what the profession in which the individual or group specializes. For example, these categories may be broad, such as doctor, lawyer, realtor, etc., or more specific, such as intellectual property attorney, cardiologist, etc. In that regard, the accuracy of the transcription may increase if the ASR 210 and/or SLU unit 220 used is trained on the specific domain.

As stated above, the audio files (e.g., .wavs, etc.) for transcription may be uploaded using the web or through a toll-free, local, or long distance telephone number and a password, for example. The password can be a phrase, PIN or other number that is spoken or entered on a keypad, for example. Verification can also be performed by swiping a credit card or entering an account number.

The input provided by the user to automated web transcription service unit 130 may follow a template that is specific to their profession or practice. For example, in the medical profession, the system may provide standard structure for various medical reports or customized templates may be provided to the system in advance. So within the structure a doctor may decide that there are five sections for possible dictation. One section could be the patient's background, second section could be the patient's history, third one could be the patient's allergy to medications, fourth could be a recommendation for a diagnosis, the fifth section could be where to send the report. A doctor may choose to dictate all sections or just certain ones.

In that manner, a doctor may say "Patient's history" and begin dictating for that section or simply "GO TO section one". After that section is complete, the doctor may give an "END OF SECTION" command or simply state the name of the next section on the template such as "diagnosis" and beginning dictating that section. Therefore, the user can jump to various sections in the template and skip sections altogether. Thus, as stated above, the automated web transcription service unit 130 may be able to recognize these sections as specific system commands and act on them apart from the dictation itself.

Since individual make mistakes, matter instructions or commands may be recognized so that the user can navigate through the dictation and correct mistakes. Commands such as "BACK", "GO TO", BEGINNING OF LINE", etc. may be used and recognized by the ASR 210 and understood by the SLU unit 220.

The automated web transcription service unit 130 may require the user to train the ASR 210 according the individual's specific voice, language and/or dialect. The individual may spend time training the system or upload pre-recorded audio file which generate transcriptions can be review and corrected for feedback.

Therefore, the automated web transcription service unit 130 may use several models for an individual. For example, if the individual is a doctor, the automated web transcription service unit 130 may use an acoustic model, a language model, and a pronunciation model that are used to operate with his/her voice. The acoustic model extracts the features and quality of an individual's voice, as opposed from some-one else's voice. The language model tracks the language or context used by the speaker and may customize the model to the individual's practice or profession. The pronunciation model tracks the personalized pronunciation features of words used by the individual.

In all of these models, the automated web transcription service unit 130 is trying to maximize the accuracy of the transcription not for a just any doctor, but for each individual doctor using the service. Therefore, the automated web transcription service unit 130 may track and adapt to the individual to provide a personalized model.

The automated web transcription service unit 130 may also provide the ability to go to a user interface for changing or correcting the transcription that may permit the user to click on any word or phrase and listen to what the dictation said for that particular word or phrase.

The automated web transcription service unit 130 may provide archival services for transcribed documents using the web transcription database 240, for example, so that an individual or intuition may go back several years and review note and files.

The automated web transcription service unit 130 may use a form of adaptive speech recognition. In particular, when a doctor dictates into the automated web transcription service unit 130 and then reviews the transcription, he or she may make corrections. However, the doctor may make corrections not because the automated web transcription service unit 130 made an error but because he or she wanted something reworded. So the end product is a final report that may not be an accurate transcription of a speech because items were changed. The adaptation occurs once the transcribed document is submitted where the automated web transcription service unit 130 identifies segments of what it feels confident that were linked to the changed words and it adapts. Thus, the automated web transcription service unit 130 is learning and adapting from all available information.

The automated web transcription service unit 130 may be configured to provide the user with a transcript that highlights words or phrases for which it did not attain a certain confidence level. The user could then review those words and provide feedback to the system to improve future accuracy.

The automated web transcription service unit 130 may also learn adaptive learning techniques from new data and human correction data that involve sharing the data from a larger user base. For example, the automated web transcription service unit 130 may utilize specific new and/or correction data from a group of people that are lawyers, a group that are doctors, etc. and make it available for the recognition and understanding benefit of all of the users in that particular category.

The automated web transcription service unit 130 may also track the accuracy of particular transcriptions. For example, if the transcription is found to be below a certain accuracy level, the user does not have to pay for the transcription. In this manner, the automated web transcription service unit 130 can track the number of corrections made to gauge the accuracy or record the ASR's 210 confidence level that words were correct.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if some or all of the conferences the user is attending do not provide the functionality described herein. In other words, there may be multiple instances of the automated web transcription service unit 130 in FIGS. 1-3 each processing the content in various possible ways. It does not necessarily need to be one system used by all end users. Accordingly, the appended claims and their legal equivalents should only define the invention, rather than any specific examples given.

We claim:

1. A method comprising:
    upon verifying an identity of a user:
        identifying, via a processor, a template for a domain associated with the user;
        receiving input speech from the user, the input speech comprising a substantive portion and an instructional portion, the instructional portion related to navigation between fields in the template;
        transcribing the substantive portion of the input speech to text, to yield transcribed text;
        inserting the transcribed text into the template, to yield a completed template; and
        storing the completed template in a database; and
    upon receiving a request to play a dictation for a particular word in the completed template, playing the dictation of the particular word.

2. The method of claim 1, wherein the request to play the dictation is made by a second user.

3. The method of claim 1, further comprising adjusting a cost of the transcribed text based on an accuracy of the transcribed text.

4. The method of claim 1, further comprising prompting a second user to select one of printing the transcribed text, sending the transcribed text to another party, and saving the transcribed text to a memory.

5. The method of claim 1, wherein transcribing the substantive portion of the input speech further comprises transcribing the substantive portion into a predefined document template.

6. The method of claim 1, wherein transcribing the substantive portion of the input speech further comprises highlighting the transcribed text based on recognition confidence levels.

7. The method of claim 1, further comprising adapting the method based on correction data and new data.

8. A system comprising:
    a processor; and
    a computer-readable storage medium having instructions stored which, when executed by the processor, cause the processor to perform operations comprising:
        upon verifying an identity of a user:
            identifying, via a processor, a template for a domain associated with the user;
            receiving input speech from the user, the input speech comprising a substantive portion and an instructional portion, the instructional portion related to navigation between fields in the template;
            transcribing the substantive portion of the input speech to text, to yield transcribed text;
            inserting the transcribed text into the template, to yield a completed template; and
            storing the completed template in a database; and
        upon receiving a request to play a dictation for a particular word in the completed template, playing the dictation of the particular word.

9. The system of claim 8, wherein the request to play the dictation is made by a second user.

10. The system of claim 8, the computer-readable storage medium having additional instructions stored which result in operations further comprising adjusting a cost of the transcribed text based on an accuracy of the transcribed text.

11. The system of claim 8, the computer-readable storage medium having additional instructions stored which result in operations further comprising prompting a second user to select one of printing the transcribed text, sending the transcribed text to another party, and saving the transcribed text to a memory.

12. The system of claim 8, wherein transcribing the substantive portion of the input speech further comprises transcribing the substantive portion into a predefined document template.

13. The system of claim 8, wherein transcribing the substantive portion of the input speech further comprises highlighting the transcribed text based on recognition confidence levels.

14. The system of claim 8, the computer-readable storage medium having additional instructions stored which result in operations further comprising adapting the method based on correction data and new data.

15. A computer-readable storage device having instructions stored which, when executed by a computing device, cause the computing device to perform operations comprising:
    upon verifying an identity of a user:
        identifying, via a processor, a template for a domain associated with the user;
        receiving input speech from the user, the input speech comprising a substantive portion and an instructional portion, the instructional portion related to navigation between fields in the template;
        transcribing the substantive portion of the input speech to text, to yield transcribed text;

inserting the transcribed text into the template, to yield a completed template; and storing the completed template in a database; and upon receiving a request to play a dictation for a particular word in the completed template, playing the dictation of the particular word.

16. The computer-readable storage device of claim 15, wherein the request to play the dictation is made by a second user.

17. The computer-readable storage device of claim 15, the computer-readable storage device having additional instructions stored which result in operations further comprising adjusting a cost of the transcribed text based on an accuracy of the transcribed text.

18. The computer-readable storage device of claim 15, the computer-readable storage device having additional instructions stored which result in operations further comprising prompting a second user to select one of printing the transcribed text, sending the transcribed text to another party, and saving the transcribed text to a memory.

19. The computer-readable storage device of claim 15, wherein transcribing the substantive portion of the input speech further comprises transcribing the substantive portion into a predefined document template.

20. The computer-readable storage device of claim 15, wherein transcribing the substantive portion of the input speech further comprises highlighting the transcribed text based on recognition confidence levels.

* * * * *